US012755307B2

(12) United States Patent
Kawaguti

(10) Patent No.: US 12,755,307 B2
(45) Date of Patent: Oct. 6, 2026

(54) STORE SERVER, METHOD, AND MEDIUM

(71) Applicant: Toshiba Tec Kabushiki Kaisha, Tokyo (JP)

(72) Inventor: Takesi Kawaguti, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/057,882

(22) Filed: Feb. 19, 2025

(65) Prior Publication Data

US 2025/0322439 A1 Oct. 16, 2025

(30) Foreign Application Priority Data

Apr. 11, 2024 (JP) ................................ 2024-063723

(51) Int. Cl.
*G06Q 30/02* (2023.01)
*G06Q 30/0241* (2023.01)
*G06Q 30/0601* (2023.01)
*G06F 40/134* (2020.01)

(52) U.S. Cl.
CPC ..... *G06Q 30/0617* (2013.01); *G06Q 30/0276* (2013.01); *G06F 40/134* (2020.01)

(58) Field of Classification Search
CPC ........... G06Q 30/0617; G06Q 30/0276; G06Q 30/0207–30/0277; G06Q 40/20; G06F 40/134
See application file for complete search history.

(56) References Cited

U.S. PATENT DOCUMENTS

2007/0073650 A1* 3/2007 Lueck ................. G06F 16/9577
2008/0287150 A1* 11/2008 Jiang ....................... H04W 4/14 455/466
2014/0279050 A1* 9/2014 Makar ................. G06F 16/9535 705/14.66
2020/0380199 A1* 12/2020 Judovsky .............. G06F 40/284
2021/0133801 A1* 5/2021 Adibi ................. G06Q 30/0245
2021/0165787 A1* 6/2021 Kimura ............... G06F 16/2423
2021/0241342 A1* 8/2021 Naidu ............... G06F 16/24522
2021/0286950 A1* 9/2021 Quamar ................ G06F 40/295
2024/0249318 A1* 7/2024 Spiegel .............. G06Q 30/0269
2024/0338740 A1* 10/2024 Aswani .............. G06Q 30/0613
2024/0346566 A1* 10/2024 Qin ......................... G06F 40/40
2025/0061491 A1* 2/2025 Ahmad-Taylor ............................ G06Q 30/0271

FOREIGN PATENT DOCUMENTS

JP 2023-120862 A 8/2023

* cited by examiner

*Primary Examiner* — Thuy N Nguyen
(74) *Attorney, Agent, or Firm* — Kim & Stewart LLP

(57) ABSTRACT

A server for managing data of items sold by a store, includes a network interface configured to communicate with a mobile terminal, a memory, and a processor configured to execute a program stored in the memory to perform: upon receipt of first text from the terminal, inputting the first text about an item sold by the store to a model, which generates in response thereto second text that promotes the item, acquiring related information corresponding to the item, generating third text based on the acquired information, storing the third text in a location, and generating a link to the location, generating answer information including the second text and the link, and transmitting the answer information to the mobile terminal.

19 Claims, 6 Drawing Sheets

STORE SERVER, METHOD, AND MEDIUM

CROSS-REFERENCE TO RELATED APPLICATION(S)

This application is based upon and claims the benefit of priority from Japanese Patent Application No. 2024-063723, filed Apr. 11, 2024, the entire contents of which are incorporated herein by reference.

FIELD

Embodiments described herein relate generally to a store server, a method, and a medium.

BACKGROUND

In recent years, a technique of generating a sentence using an artificial intelligence (AI) model (also referred to as a generative AI) such as a large language model (LLM) has been proposed. The large language model is an AI model pre-trained in a large-scale corpus in the field of natural language processing. To give an example, when text describing an inquiry is inputted into the LLM together with instruction information (also referred to as a prompt) instructing an output form, an answer sentence related to the inquiry is generated and output in the instructed form.

Incidentally, as a service using the above-described AI model, it is conceivable to provide the user with information related to matters included in the answer sentence output by AI model (hereinafter, also referred to as related information). For example, in a case where an answer sentence related to an item is output, it is conceivable to provide related information such as a price and an image of the item in addition to the answer sentence.

However, if such related information is simply added, the answer sentence directly corresponding to the inquiry from the user may become inconspicuous.

SUMMARY OF THE INVENTION

Embodiments of the present disclosure provide a store server, a method, and a medium that can improve readability of an answer sentence with respect to other related information.

A store server for managing data of items sold by a store, comprises a network interface configured to communicate with a mobile terminal, a memory, and a processor configured to execute a program that is stored in the memory to perform the steps of: upon receipt of first text from the mobile terminal, inputting the first text about an item sold by the store to a computer model, which generates in response thereto second text that promotes the item, the computer model is trained with [ ], acquiring related information corresponding to the item, generating third text based on the acquired related information, storing the third text in a storage location, and generating a link to the storage location, generating answer information including the second text and the link, and controlling the network interface to transmit the answer information to the mobile terminal.

DETAILED DESCRIPTION

Hereinafter, embodiments will be described with reference to the drawings. Further, the present invention is not limited by the following embodiments, and the constituent elements in the following embodiments include those that can be easily conceived by a person skilled in the art, those that are substantially the same, and those that have a so-called equivalent range. Moreover, various omissions, substitutions, changes, and combinations of components can be made without departing from the spirit of the embodiments described below.

Figure 1:
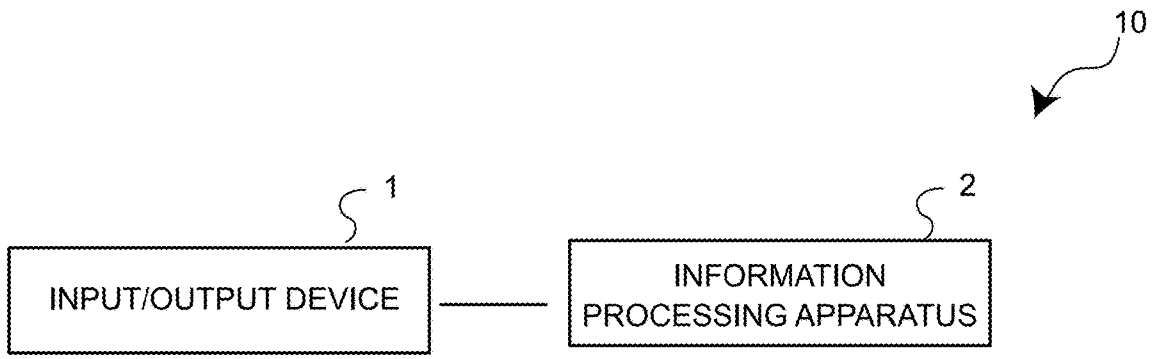
FIG. 1 is a schematic diagram illustrating a schematic configuration of an information processing system according to an embodiment.

FIG. 1 is a schematic diagram illustrating a schematic configuration of an information processing system 10 according to an embodiment. The information processing system 10 is a system including an input/output device 1 and an information processing apparatus 2.

The input/output device 1 is, for example, a portable or mobile terminal. The input/output device 1 is, for example, a smartphone owned by a user. The input/output device 1 may be a tablet type terminal device. Further, the input/output device 1 may be a mobile terminal loaned to a user by a store.

For example, the input/output device 1 acquires text data of a question sentence input by a user, and outputs the acquired text data to the information processing apparatus 2. Further, for example, the input/output device 1 acquires answer information corresponding to the question sentence output from the information processing apparatus 2, and provides the acquired answer information to the user. Details of the answer information will be described later.

The information processing apparatus 2 is, for example, a store server or the like, or a server device managed by an operating company that operates a restaurant. In this description, the term "store" is used to include both a store that sells goods and a restaurant that prepares and serves food and drinks, and the term "item" includes both goods and services.

Further, the information processing apparatus 2 is, for example, a computer including a generative AI model, such as a large language model, which is trained with massive amounts of text data, based on which it learns to predict the next word in a sequence, effectively allowing it to understand language patterns and generate human-like text by identifying relationships between words and context within the data. The large language model implemented herein generates a sales promotion sentence in response to a query made thereto.

The information processing apparatus 2 includes one or a plurality of computers. The information processing apparatus 2 assists sales promotion of an item sold at a store on the basis of the question sentence acquired via the input/output device 1. The information processing apparatus 2 is connected to the input/output device 1 via a communication line such as a mobile network.

Figure 2:
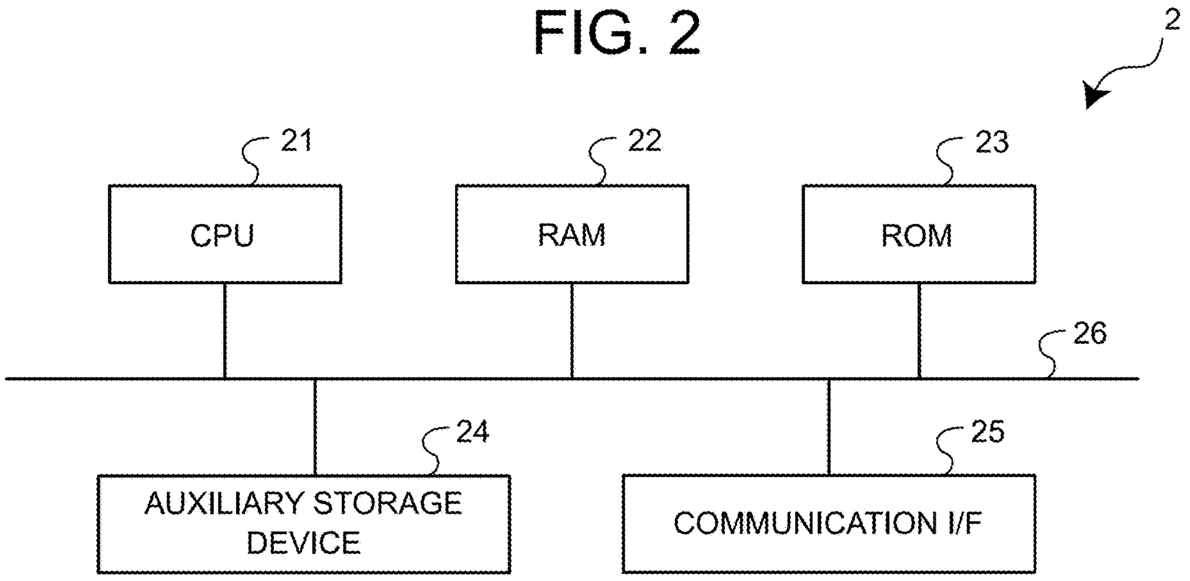
FIG. 2 is a block diagram illustrating a hardware configuration of an information processing apparatus according to an embodiment.

Next, a hardware configuration of the information processing apparatus 2 will be described with reference to FIG. 2. FIG. 2 is a block diagram illustrating a hardware configuration of the information processing apparatus 2. As illustrated in FIG. 2, the information processing apparatus 2 includes a Central Processing Unit (CPU) 21, a Random Access Memory (RAM) 22, a Read Only Memory (ROM) 23, an auxiliary storage device 24, and a communication interface (I/F) 25.

The CPU 21 is a processor. The RAM 22 temporarily stores programs and various types of data. The ROM 23 stores various programs. The auxiliary storage device 24 stores various programs and data. The communication I/F 25 is an interface circuit for performing data communication with the input/output device 1.

The CPU 21, the RAM 22, the ROM 23, the auxiliary storage device 24, and the communication I/F 25 are connected to each other via a bus 26. The CPU 21, the RAM 22 and the ROM 23 constitute a controller. That is, the controller executes a control process of the information processing apparatus 2, which will be described later, in accordance with the control program loaded into the RAM 22.

The auxiliary storage device 24 is a non-volatile memory such as a Hard Disc Drive (HDD) or a flash memory in which the storage data is held even when the power is turned off. The auxiliary storage device 24 stores answer sentences and sales promotion information acquired by the information processing apparatus 2, reference information generated by the information processing apparatus 2, address information, and answer information. Details of the answer sentence, the sales promotion information, the reference information, the address information, and the answer information will be described later.

The information processing apparatus 2 is installed in a secure, local environment, which cannot be accessed from outside. With this configuration, since the input text information for performing the processing of the large language model included in the information processing apparatus 2 to be described later may include customer information or the like of the customer, the information processing apparatus 2 can contribute to the protection of the personal information by being arranged and used in the local environment.

Figure 3:
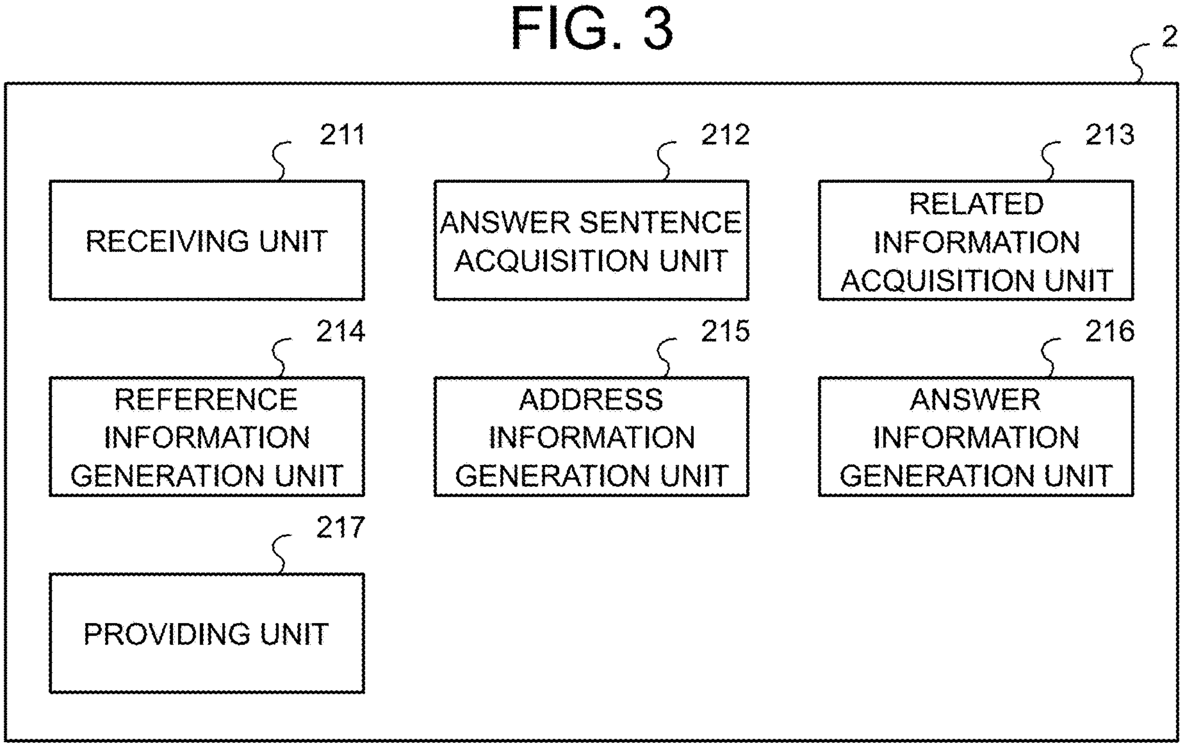
FIG. 3 is a block diagram illustrating a functional configuration of the information processing apparatus.

FIG. 3 is a block diagram illustrating a functional configuration of the information processing apparatus 2. As illustrated in FIG. 3, the information processing apparatus 2 includes a receiving unit 211, an answer sentence acquisition unit 212, a related information acquisition unit 213, a reference information generation unit 214, an address information generation unit 215, an answer information generation unit 216, and a providing unit 217. Note that the functional configuration of the information processing apparatus 2 is not limited to this.

The receiving unit 211 receives a question sentence. Specifically, the receiving unit 211 receives a question sentence input by a user who uses a store that sells an item, which is output by the input/output device 1. For example, the question sentence is data including a question content. Further, the question sentence may include personal information such as a name, a telephone number, and an e-mail address of the user who asked the question. As the content of the question, for example, there is a content related to an item sold at a store such as "What is a recommended item?". Further, the receiving unit 211 stores the received question sentence in the auxiliary storage device 24.

The answer sentence acquisition unit 212 acquires an answer sentence. Specifically, the answer sentence acquisition unit 212 inputs the question sentence received by the receiving unit 211 to the large language model functionally configured to output the answer sentence for the question sentence, and acquires the answer sentence output by the large language model.

For example, the answer sentence acquisition unit 212 inputs a question sentence and instruction information (i.e., a prompt) instructing an output form of the answer to the question into the large language model by a known method, thereby generating an answer sentence in which the question sentence is answered to the large language model, and acquiring the answer sentence output from the large language model. The answer sentence includes at least item information related to an item to be recommended to the user and a sentence related to the sales promotion of the item. The item information is, for example, a genre of an item, a name of an item, or the like. Note that the question sentence may be included in the prompt.

For example, the answer sentence acquisition unit 212 generates a prompt to give item information related to an item to be recommended to the user, to give a sentence related to a sales promotion of the item, and the like in order to answer a question from the user. The prompt may be prepared in advance in the auxiliary storage device 24 or may be dynamically generated by the answer sentence acquisition unit 212. In addition, the prompt may include a description indicating an information source in which information on a candidate item is stored. The answer sentence acquisition unit 212 stores the acquired answer sentence in the auxiliary storage device 24.

The related information acquisition unit 213 acquires related information. Specifically, the related information acquisition unit 213 acquires related information based on an item sold at a store. For example, the related information acquisition unit 213 acquires, from the auxiliary storage device 24, sales promotion information related to the item indicated in the answer sentence. The sales promotion information includes item information on a sales promotion target item, such as a genre, an item code, an item name, and a price of the sales promotion target item. It is to be noted that the sales promotion target item can be set to an item to be discounted, an item having a large sales number, an item having a large inventory number among the items owned by the store, a sales promotion target item, and the like. The related information acquisition unit 213 stores the acquired sales promotion information in the auxiliary storage device 24.

The reference information generation unit 214 generates the reference information obtained by forming the related information on the basis of the answer sentence and the related information. Specifically, the reference information generation unit 214 generates reference information obtained by forming the related information on the basis of the answer sentence acquired by the answer sentence acquisition unit 212 and the related information acquired by the related information acquisition unit 213.

Figure 4:
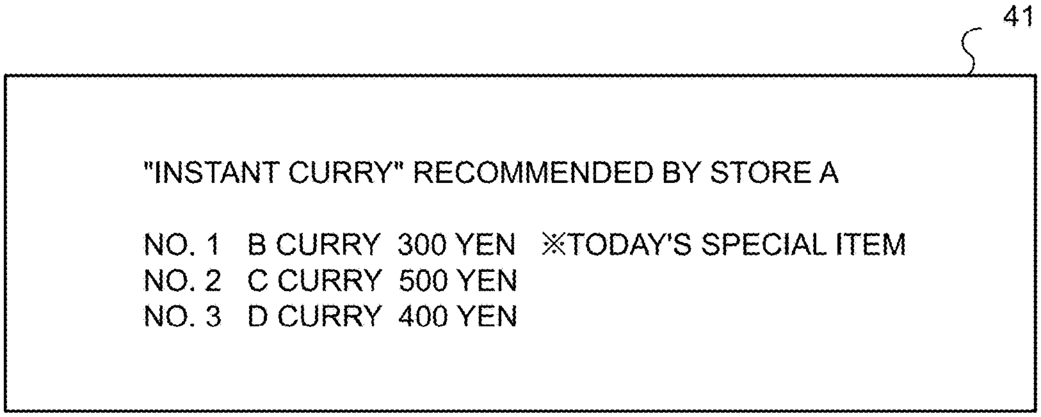
FIG. 4 is a schematic diagram illustrating reference information according to an embodiment.

For example, the reference information generation unit 214 generates reference information in which sales promotion information related to the item is added in association with the item included in the answer sentence. The reference information includes at least information including an item to be recommended to the user and a price of the item. Reference information will now be described with reference to FIG. 4. FIG. 4 is a schematic diagram illustrating reference information according to one embodiment;

In FIG. 4, it is assumed that the answer sentence acquisition unit 212 inputs the question sentence "What is a recommended item?" into the large language model and outputs "How about instant curry?" from the large language model as the answer sentence. In this case, the related information acquisition unit 213 acquires, from the auxiliary storage device 24, the sales promotion information of the sales promotion target item on the basis of the condition of the item to be discounted, the merchandise having a large number of sales, or the like for the merchandise of the retail curry sold at the store A.

Then, the reference information generation unit 214 generates the reference information illustrated in FIG. 4 based on the answer sentence and the sales promotion information. Specifically, the reference information generation unit 214 generates the reference information 41 describing the sales promotion information of the top three items with respect to the "instant curry" recommended by the "store A". Here, in the reference information 41, a rank and a price are shown as information on instant curry items. Further, in the reference information 41, information indicating that the item is a special item is added to "B curry" which is an item subject to discount. The reference information generation unit 214 stores the generated reference information 41 in the auxiliary storage device 24.

Note that the number of the sales promotion target item acquired by the related information acquisition unit 213 and the number of the items described in the reference information by the reference information generation unit 214 are not limited to the example of FIG. 4, but it is preferable to set the number of items to a small number from the viewpoint of readability (for example, within five).

The related information may be formed according to one of predefined patterns such as templates. The related information may be shaped using a large language model.

Returning to FIG. 3, the address information generation unit 215 generates address information that can be referred to. Specifically, the address information generation unit 215 generates address information that can refer to the related information acquired by the related information acquisition unit 213. For example, the address information generation unit 215 generates address information indicating a Uniform Resource Locator (URL) of a website or web page on which the related information acquired by the related information acquisition unit 213 is posted. Specifically, the address information generation unit 215 stores the related information in a Web server, and generates address information to be an access destination to the related information.

Further, the address information generation unit 215 generates address information that can refer to the reference information generated by the reference information generation unit 214. For example, the address information generation unit 215 generates address information indicating URL of a Web page on which the reference information generated by the reference information generation unit 214 is posted. Specifically, the address information generation unit 215 stores the reference information in a Web server, and generates address information to be an access destination to the reference information.

The address information generated by the address information generation unit 215 is an URL of a Web page to which the input/output device 1 can be connected. The address information generation unit 215 stores the generated address information in the auxiliary storage device 24.

The answer information generation unit 216 generates first answer information. Specifically, the answer information generation unit 216 generates the first answer information including the answer sentence acquired by the answer sentence acquisition unit 212 and the address information generated by the address information generation unit 215. For example, the answer information generation unit 216 generates the first answer information including the answer sentence acquired by the answer sentence acquisition unit 212 and the address information generated by the address information generation unit 215 that can refer to the related information. In addition, the answer information generation unit 216 generates the first answer information including address information capable of referring to the reference information generated by the reference information generation unit 214. The answer information generation unit 216 stores the generated answer information in the auxiliary storage device 24.

Figure 5:
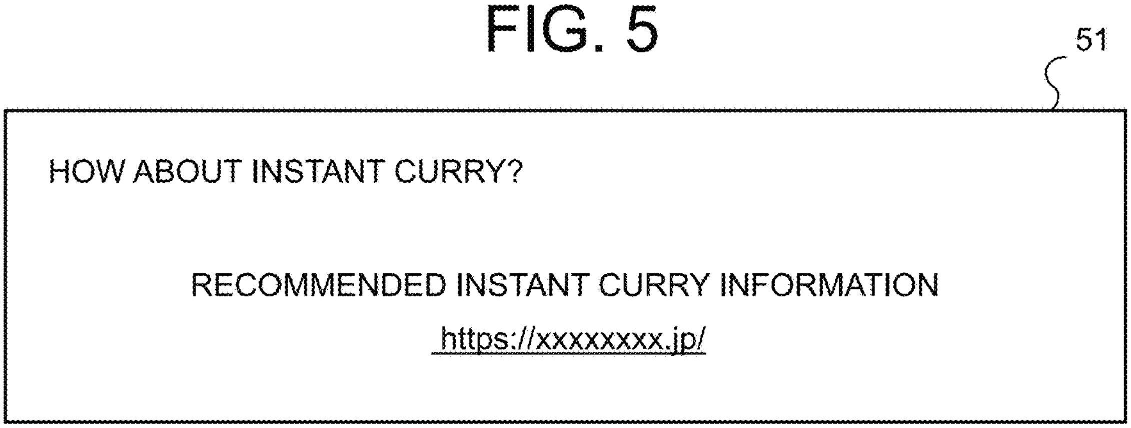
FIG. 5 is a schematic diagram illustrating first answer information according to an embodiment.

The providing unit 217 provides answer information. Specifically, the providing unit 217 provides the first answer information generated by the answer information generation unit 216 to the user via the input/output device 1. Here, the first answer information provided by the providing unit 217 will be described with reference to FIG. 5. FIG. 5 is a schematic diagram illustrating first answer information according to an embodiment;

FIG. 5 shows an example of the first answer information assuming the same question sentence and answer sentence as in FIG. 4. As illustrated in FIG. 5, the first answer information 51 includes the answer sentence "How about instant curry?" that answers the above-described question sentence and the addressing information "https://www.xxxxxxxx.jp/". Note that the "recommended instant curry information" may be information based on the reference information of the link destination of the sales promotion information or the address information, or may be a character string automatically generated by the answer information generation unit 216 based on the answer sentence or the like.

Here, the answer sentence indicated in the first answer information 51 is clearly indicated without being buried in the sales promotion information (i.e., the reference information). Accordingly, the user can easily confirm the answer sentence corresponding to the question sentence. Further, the user can confirm the content of the sales promotion information provided from the store by referring to URL shown in the first answer information 51. Therefore, the information processing apparatus 2 can provide the user with information with improved readability regarding the answer sentence to the question sentence of the user.

Figure 6:
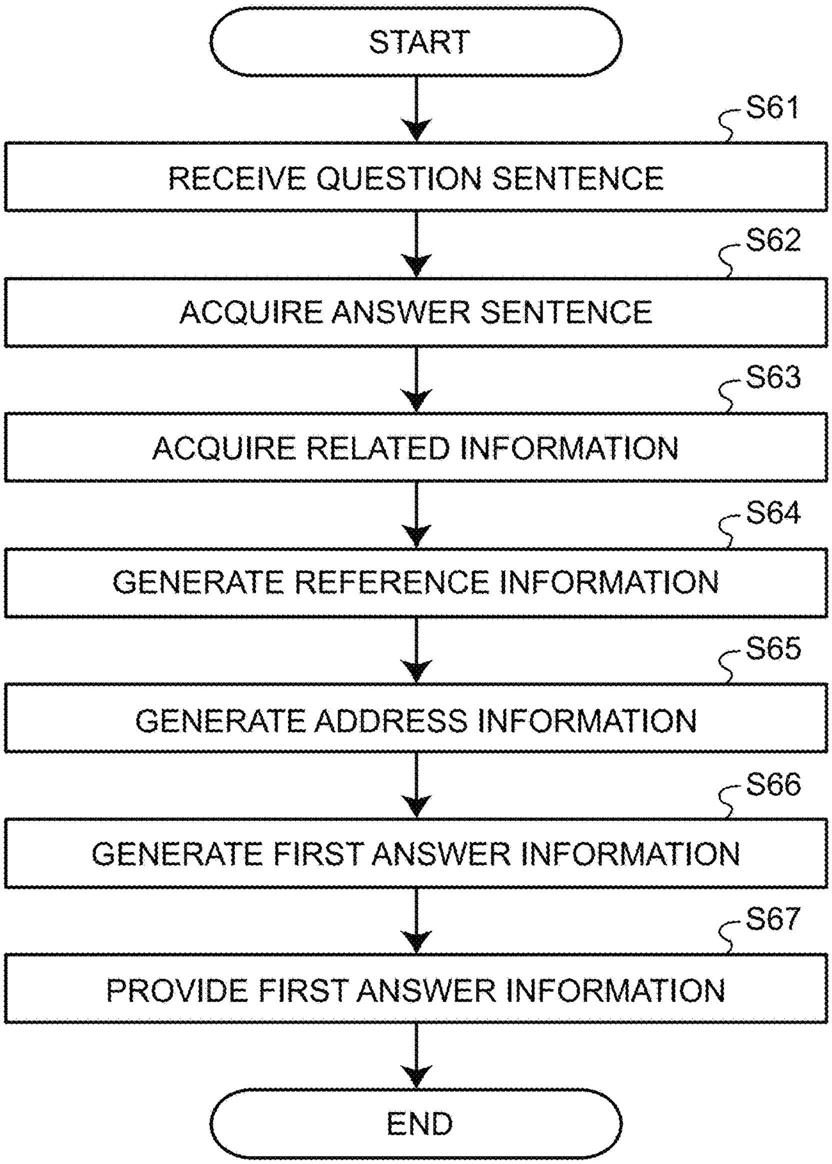
FIG. 6 is a flowchart illustrating a control process of the information processing apparatus.

Next, a control process of the information processing apparatus 2 will be described with reference to FIG. 6. FIG. 6 is a flowchart illustrating a control process of the information processing apparatus 2.

The receiving unit 211 receives a question sentence output by the input/output device 1 and input by a user who uses a store selling items (step S61). Subsequently, the answer sentence acquisition unit 212 inputs the question sentence received by the receiving unit 211 to the large language model functionally configured to output the answer sentence for the question sentence, and acquires the answer sentence output by the large language model (step S62).

Subsequently, the related information acquisition unit 213 acquires the related information based on the item sold at the store (step S63). Subsequently, the reference information generation unit 214 generates reference information obtained by forming the related information on the basis of the answer sentence acquired by the answer sentence acquisition unit 212 and the related information acquired by the related information acquisition unit 213 (step S64). Subsequently, the address information generation unit 215 generates address information that can refer to the related information acquired by the related information acquisition unit 213 (step S65). Further, the address information generation unit 215 generates address information that can refer to the reference information generated by the reference information generation unit 214.

Subsequently, the answer information generation unit 216 generates the first answer information including the answer sentence acquired by the answer sentence acquisition unit 212 and the address information generated by the address information generation unit 215 (step S66). Subsequently, the providing unit 217 provides the first answer information generated by the answer information generation unit 216 to the user via the input/output device 1 (step S67). When this process is completed, the process of the information processing apparatus 2 ends.

Accordingly, the user can confirm the answer sentence corresponding to the question sentence. Further, the user can confirm more detailed content of the sales promotion information provided from the store by referring to the URL indicated in the answer information. Therefore, the information processing apparatus 2 can provide the user with information with improved readability regarding the answer sentence to the question sentence of the user.

As described above, the information processing apparatus 2 receives the question sentence input by the user in the store, inputs the received question sentence into the large language model functionally configured to output the answer sentence to the question sentence, acquires the answer sentence output from the large language model, acquires the related information on the item indicated in the answer sentence, generates address information capable of referring to the related information, generates answer information including the answer sentence and the address information, and provides the answer information to the user.

As a result, the answer information provided by the information processing apparatus 2 can be provided with information with improved readability to the user regarding the answer to the question sentence of the user.

It should be noted that the above-described embodiments can be modified and implemented as appropriate by changing a part of the configuration or function of each of the above-described apparatuses. Therefore, in the following, some modifications according to the above-described embodiments will be described as other embodiments. Note that, in the following, differences from the above-described embodiments will be mainly described, and detailed descriptions of the same points as those described above will be omitted. Further, the modification examples described below may be implemented individually or in combination as appropriate.

(First Modification)

Figure 7:
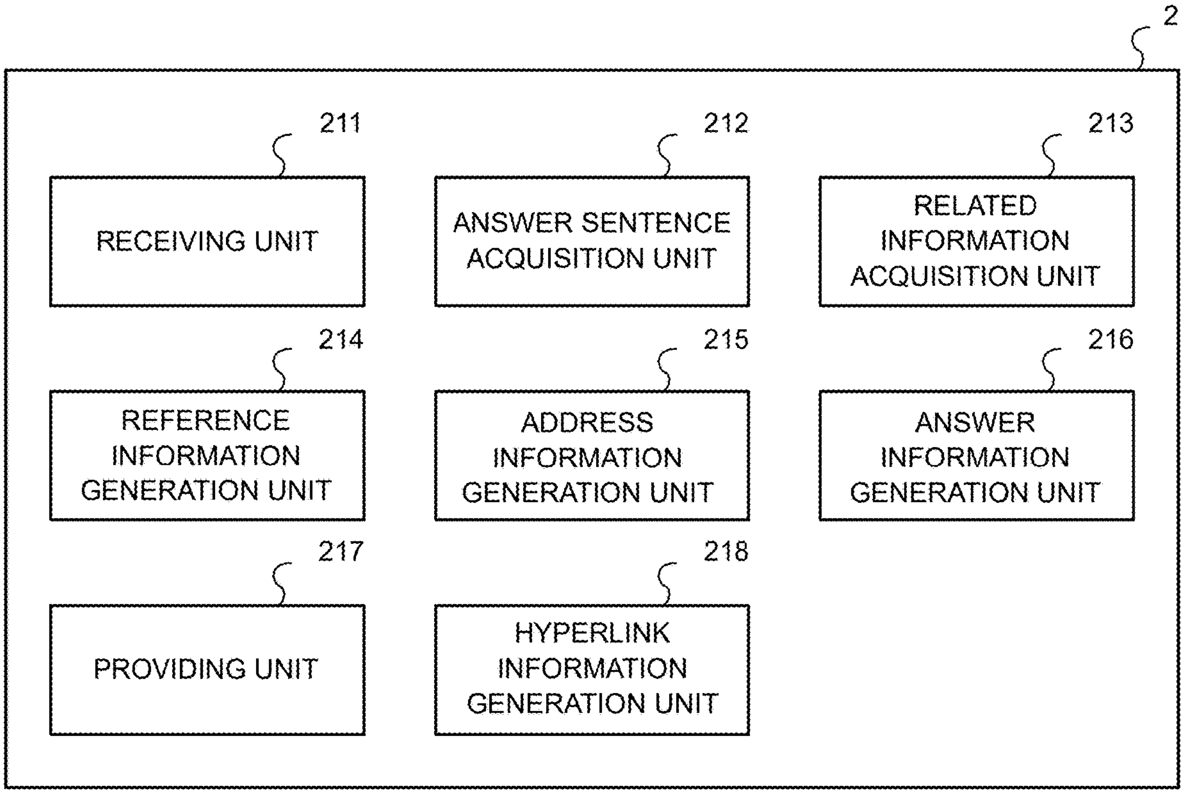
FIG. 7 is a block diagram illustrating a functional configuration of an information processing apparatus according to a first modification.

For example, an information processing apparatus 2 according to a first modification may generate hyperlink information for setting address information as a hyperlink with respect to the answer sentence. FIG. 7 is a block diagram illustrating a functional configuration of the information processing apparatus 2 according to the first modification. The information processing apparatus 2 according to the first modification illustrated in FIG. 7 further includes a hyperlink information generation unit 218 in addition to the functional configuration illustrated in FIG. 3.

The hyperlink information generation unit 218 generates hyperlink information for setting address information as a hyperlink with respect to the answer sentence. Specifically, the hyperlink information generation unit 218 generates hyperlink information for setting the address information generated by the address information generation unit 215 as a hyperlink with respect to the answer sentence acquired by the answer sentence acquisition unit 212.

For example, the hyperlink information generation unit 218 generates hyperlink information for setting the address information generated by the address information generation unit 215 as a hyperlink with respect to the answer sentence acquired by the answer sentence acquisition unit 212 or the character string representing the item in the answer sentence. The hyperlink information generation unit 218 stores the generated hyperlink information in the auxiliary storage device 24. The hyperlink information generation unit 218 may generate a hyperlink-added answer sentence by adding hyperlink information to an answer sentence or a character string representing an item in the answer sentence.

The answer information generation unit 216 generates the answer sentence in which the hyperlink information is set as the answer information. Specifically, the answer information generation unit 216 generates the answer sentence in which the hyperlink information generated by the hyperlink information generation unit 218 is set as the answer information. The answer information is also referred to as second answer information. The answer information generation unit 216 stores the generated second answer information in the auxiliary storage device 24.

The providing unit 217 provides the second answer information generated by the answer information generation unit 216 to the user via the input/output device 1. Here, the second answer information provided by the providing unit 217 will be described with reference to FIG. 8.

Figure 8:
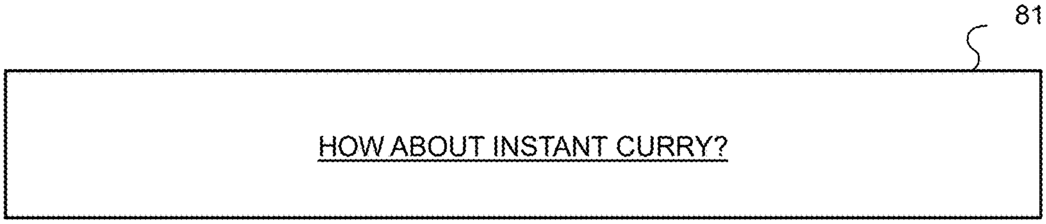
FIG. 8 is a schematic diagram illustrating second answer information according to the first modification.

FIG. 8 is a schematic diagram illustrating an example of the second answer information according to the first modification. FIG. 8 shows an example of the second answer information assuming the same question sentence and answer sentence as in FIG. 4. As illustrated in FIG. 8, in the second answer information 81, a hyperlink is set for a character string "instant curry" representing an item included in the answer sentence.

Accordingly, the user can confirm the answer sentence corresponding to the question sentence by looking at the second answer information 81. Further, the user can confirm the content of the sales promotion information (i.e., the reference information) provided from the store by referring to URL set in the "instant curry" of the second answer information.

Figure 9:
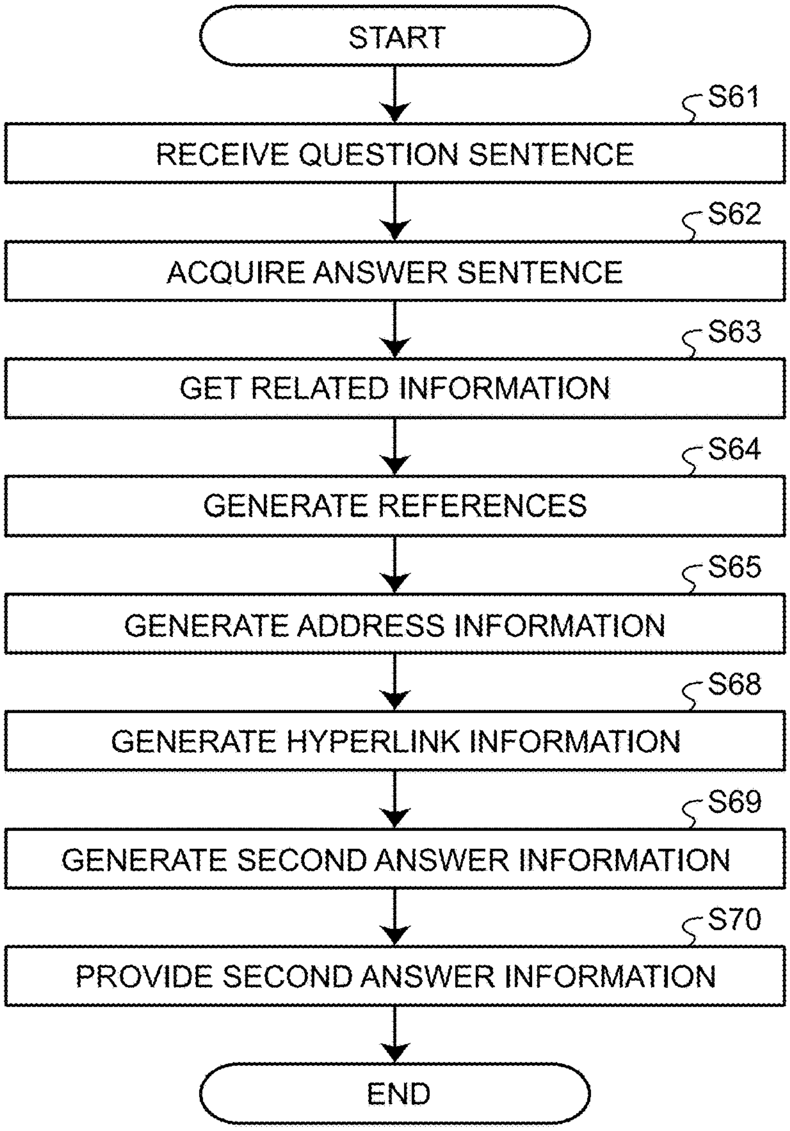
FIG. 9 is a flowchart illustrating a control process of the information processing apparatus according to the first modification.

FIG. 9 is a flowchart illustrating a control process of the information processing apparatus 2 according to the first modification. Since the processing from the step S61 to the step S65 shown in FIG. 9 is the same as the processing from the step S61 to the step S65 shown in FIG. 6, the description of the processing content is omitted.

In step S68 illustrated in FIG. 9, the hyperlink information generation unit 218 generates hyperlink information for setting the address information generated by the address information generation unit 215 as a hyperlink with respect to the answer sentence acquired by the answer sentence acquisition unit 212 (step S68). Subsequently, the answer information generation unit 216 generates the second answer information 81 including the answer sentence acquired by the answer sentence acquisition unit 212 and the hyperlink information generated by the hyperlink information generation unit 218 (step S69).

Subsequently, the providing unit 217 provides the second answer information 81 generated by the hyperlink information generation unit 218 to the user via the input/output device 1 (step S70). When this process is completed, the process of the information processing apparatus 2 ends. Accordingly, the user can confirm the answer sentence corresponding to the question sentence. Further, the user can confirm the details of the sales promotion information provided from the store by referring to the hyperlink shown in the second answer information 81.

(Second Modification)

In the above-described embodiments, the question sentence of the user has been described with respect to the content related to the recommendation of the item sold at the store, but the present invention is not limited thereto. For example, the user's questionnaire may be a menu of meals to be cooked by the user.

For example, as the content of the question included in the question sentence received by the receiving unit 211, there is a content such as "What should the today's meal be?".

For example, the answer sentence acquisition unit 212 generates a prompt describing, in order to respond to a question from the user, information regarding a menu to be recommended to the user, item information regarding an item necessary for the recommended meal, and a sentence regarding a sales promotion of the item. Then, the answer sentence acquisition unit 212 inputs the question sentence received by the receiving unit 211 to the large language model functionally configured to output the answer sentence for the question sentence, and acquires the answer sentence output by the large language model.

The related information acquisition unit 213 acquires the sales promotion information regarding the item necessary for the recommended meal indicated in the answer sentence. Then, the reference information generation unit 214 generates reference information that refers to the sales promotion information acquired by the related information acquisition unit 213.

Figure 10:
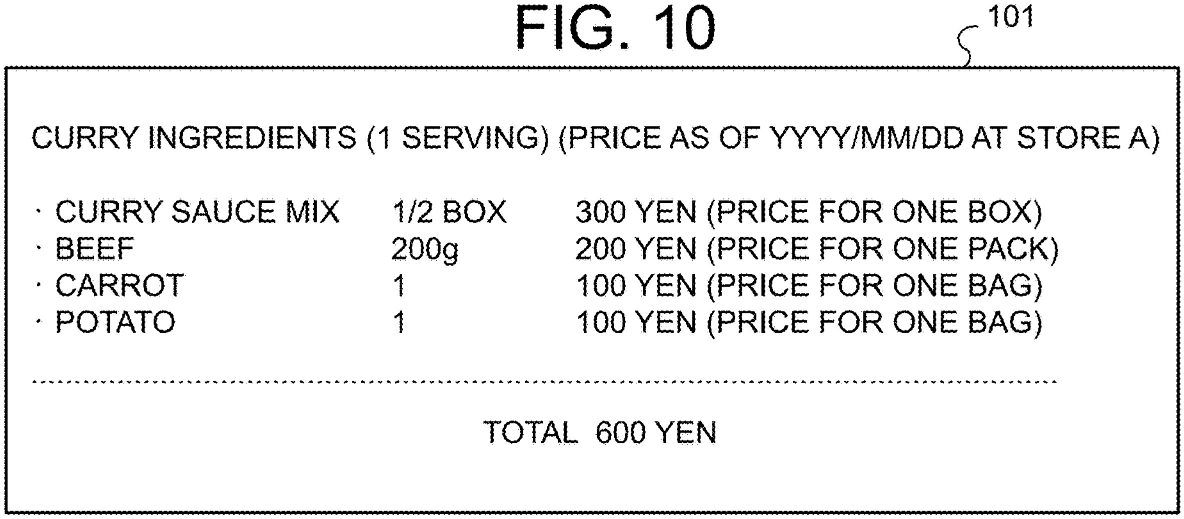
FIG. 10 is a schematic diagram illustrating reference information according to a second modification.

FIG. 10 is a schematic diagram illustrating an example of the reference information according to the second modification. The reference information 101 illustrated in FIG. 10 indicates curry ingredients as items necessary for a meal recommended to the user. In addition, the reference information 101 indicates a required amount and prices of the items as information regarding the item of the curry ingredients. Further, the reference information 101 indicates the total amount when all of the items are purchased. The reference information 101 includes the date and time when the reference information generation unit 214 generates the reference information 101 because the price of the item may fluctuate depending on the time period in which the item is sold at the store. The reference information generation unit 214 stores the generated reference information 101 in the auxiliary storage device 24.

Figure 11:
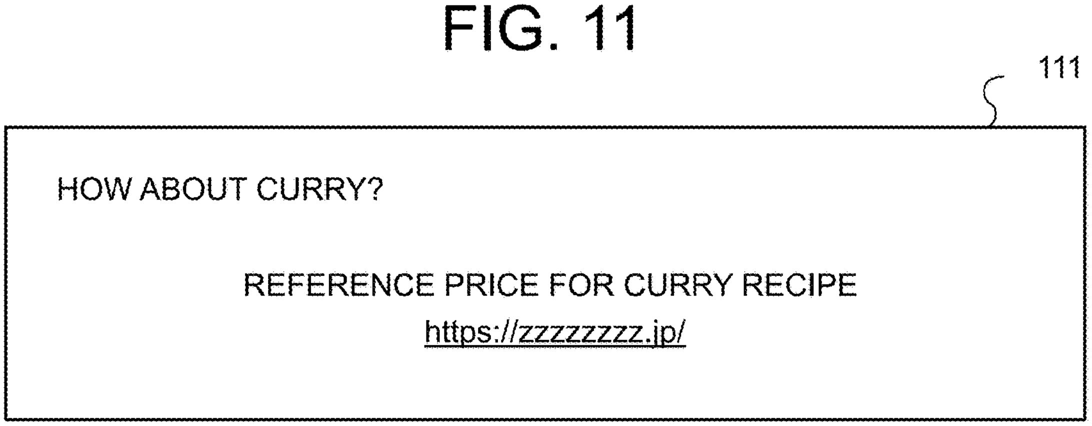
FIG. 11 is a schematic diagram illustrating first answer information according to the second modification.

FIG. 11 is a schematic diagram illustrating first answer information 111 according to the second modification. The first answer information 11 includes an answer sentence that answers the above-described question sentence and address information. The answer sentence shown in the first answer information 111 is "How about curry?" The addressing information indicated in the first answering information 111 is a URL of "https://www.zzzzzzzz.jp/". Note that the "reference price for curry recipe" may be information based on the reference information of the link destination of the sales promotion information or the address information, or may be a character string automatically generated by the answer information generation unit 216 based on the answer sentence or the like.

The answer sentence indicated in the first answer information 111 is clearly indicated without being buried in the sales promotion information. Accordingly, the user can confirm the answer sentence corresponding to the question sentence. Further, the user can confirm more detailed content of the sales promotion information provided from the store by referring to URL shown in the first answer information 111.

(Third Modification)

Figure 12:
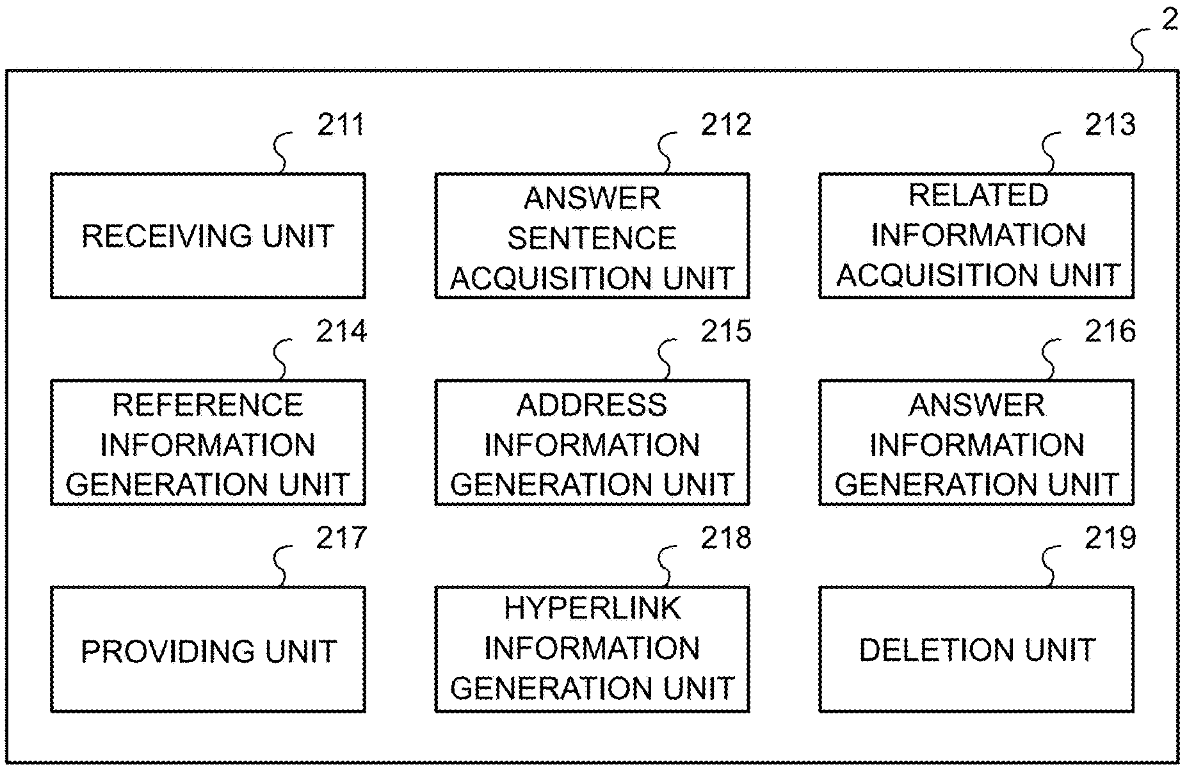
FIG. 12 is a block diagram illustrating a functional configuration of an information processing apparatus according to a third modification.

For example, an information processing apparatus 2 according to a third modification may invalidate address information and hyperlink information when a predetermined time has elapsed. FIG. 12 is a block diagram illustrating a functional configuration of the information processing apparatus 2 according to the third modification. The information processing apparatus 2 according to the third modification illustrated in FIG. 12 further includes a deletion unit 219 in addition to the functional configuration illustrated in FIG. 7.

The deletion unit 219 invalidates the address information when a predetermined time has elapsed. For example, the deletion unit 219 invalidates the URL of the addressing information and URL of the hyperlink information stored in the auxiliary storage device 24 when a predetermined period of time has elapsed. The invalidation of the address information is, for example, deletion of the address information, and is not limited thereto.

The predetermined time is, for example, a time at a timing at which the price of the item of the sales promotion information is updated or a time at a timing at which a predetermined time has elapsed after the answer information is provided to the user. Note that the predetermined time is not limited to this. Thus, the information processing apparatus 2 can provide the latest sales promotion information to the user. In addition, the information processing apparatus 2 can prevent unnecessary information from being disclosed on the Internet by deleting URL.

(Fourth Modification)

For example, the address information generation unit 215 of the information processing apparatus 2 may be configured to generate address information for all the reference information generated by the reference information generation unit 214, or may be configured to generate address information for a part of the reference information. For example, the address information generation unit 215 may generate the address information of the reference information when the information amount of the reference information generated by the reference information generation unit 214 (e.g., text amount, data capacity) exceeds a predetermined threshold value.

(Fifth Modification)

In the above-described embodiments, the information processing apparatus 2 including the large language model is arranged and used in a local environment, but the present invention is not limited thereto, and the information processing apparatus 2 including the large language model may be arranged and used in a high-security cloud environment. A high-security cloud environment is a cloud environment that is not disclosed to the Internet but is connected to an in-house server environment via a highly confidential communication line.

The program(s) executed by the information processing apparatus 2 of the embodiments may be stored in a computer connected to a network such as the Internet, and may be downloaded via a network. Further, the programs executed by the information processing apparatus 2 according to the embodiments and the modifications may be provided or distributed via a network such as the Internet.

The programs executed by the apparatuses of the above-described embodiments are provided in advance in a ROM, a storage unit, or the like. The programs executed by the apparatuses of the above-described embodiments may be recorded in a computer-readable recording medium such as a CD-ROM, a flexible disk (FD), or a CD-R, a Digital Versatile Disk (DVD) in an installable format or an executable format.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A store server for managing data of items sold by a store, comprising:
- a network interface configured to communicate with a mobile terminal;
- a memory; and
- a processor configured to execute a program that is stored in the memory to perform the steps of:
  - upon receipt of first text from the mobile terminal, inputting the first text to a computer model, which generates in response thereto second text suggesting an item for purchase,
  - acquiring related information corresponding to each of multiple candidate items corresponding to the suggested item,
  - generating third text using the acquired related information, and storing the third text in a storage location,
  - determining whether a length of the third text is longer than a predetermined length, and
  - upon determining that the length of the third text is longer than the predetermined length,
    - generating a link to the storage location of the third text,
    - generating answer information including the second text and the link, without including the third text, and
    - controlling the network interface to transmit the answer information to the mobile terminal.

2. The store server according to claim 1, wherein
- the mobile terminal displays the second text and the link separately.

3. The store server according to claim 1, wherein
- the mobile terminal displays the second text that is hyperlinked with the link.

4. The store server according to claim 1, wherein
- in the third text, the related information of each of the candidate items is arranged according to a predetermined template.

5. The store server according to claim 1, wherein
- the processor executes the program to perform the step of disabling the link after a predetermined time elapses from the generation of the link.

6. The store server according to claim 1, wherein
- the third text indicates a name and a price of each of the candidate items.

7. A method for managing data of items sold by a store, the method comprising:
- receiving first text from a mobile terminal;
- inputting the first text to a computer model, which generates in response thereto second text suggesting an item for purchase;
- acquiring related information corresponding to each of multiple candidate items corresponding to the suggested item;
- generating third text using the acquired related information, and storing the third text in a storage location;
- determining that a length of the third text is longer than a predetermined length, and generating a link to the storage location of the third text;
- generating answer information including the second text and the link, without including the third text; and
- transmitting the answer information to the mobile terminal.

8. The method according to claim 7, further comprising:
- causing the mobile terminal to display the second text and the link separately.

9. The method according to claim 7, further comprising:
- causing the mobile terminal to display the second text that is hyperlinked with the link.

10. The method according to claim 7, further comprising:
- arranging, in the third text, the related information of each of the candidate items according to a predetermined template.

11. The method according to claim 7, further comprising:
- disabling the link after a predetermined time elapses from the generation of the link.

12. The method according to claim 7, wherein
- the third text indicates a name and a price of each of the candidate items.

13. A non-transitory computer readable medium storing a program causing a computer to perform a method for managing data of items sold by a store, the method comprising:
- receiving first text from a mobile terminal;
- inputting the first text to a computer model, which generates in response thereto second text suggesting an item for purchase;
- acquiring related information corresponding to each of multiple candidate items corresponding to the suggested item;
- generating third text using the acquired related information, and storing the third text in a storage location;
- determining that a length of the third text is longer than a predetermined length, and generating a link to the storage location of the third text;
- generating answer information including the second text and the link, without including the third text; and
- transmitting the answer information to the mobile terminal.

14. The computer readable medium according to claim 13, wherein the method further comprises causing the mobile terminal to display the second text and the link separately.

15. The computer readable medium according to claim 13, wherein the method further comprises causing the mobile terminal to display the second text that is hyperlinked with the link.

16. The computer readable medium according to claim 13, wherein the method further comprises arranging, in the third text, the related information of each of the candidate items according to a predetermined template.

17. The computer readable medium according to claim 13, wherein the method further comprises disabling the link after a predetermined time elapses from the generation of the link.

18. The computer readable medium according to claim 13, wherein the third text indicates a name and a price of each of the candidate items.

19. The store server according to claim 1, wherein the processor executes the program to perform the steps of disabling the link when price information included in the third text stored in the storage location is updated, and generating a new link corresponding to the updated third text stored in a different storage location, the updated third text including new price information.

* * * * *